No. 612,017. Patented Oct. 11, 1898.
E. J. CLUBBE & A. W. SOUTHEY.
STEERING WHEEL FOR MOTOR VEHICLES.
(Application filed Mar. 23, 1897.)
(No Model.) 2 Sheets—Sheet 1.

WITNESSES:
Fred White
Thomas F. Wallace

INVENTORS:
Ernest John Clubbe and Alfred William Southey,
By their Attorneys:
Arthur C. Fraser & Co No. 612,017. Patented Oct. 11, 1898.
E. J. CLUBBE & A. W. SOUTHEY.
STEERING WHEEL FOR MOTOR VEHICLES.
(Application filed Mar. 23, 1897.)
(No Model.) 2 Sheets—Sheet 2.
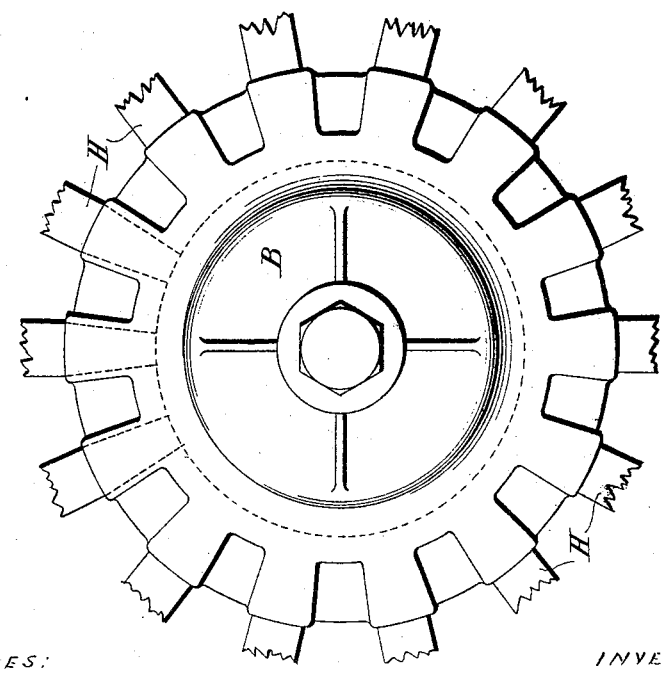

UNITED STATES PATENT OFFICE.

ERNEST J. CLUBBE AND ALFRED W. SOUTHEY, OF LONDON, ENGLAND.

STEERING-WHEEL FOR MOTOR-VEHICLES.

SPECIFICATION forming part of Letters Patent No. 612,017, dated October 11, 1898.

Application filed March 23, 1897. Serial No. 628,817. (No model.) Patented in England June 27, 1896, No. 14,284, and in France September 2, 1896, No. 259,395.

*To all whom it may concern:*

Be it known that we, ERNEST JOHN CLUBBE and ALFRED WILLIAM SOUTHEY, of London, England, have invented certain new and useful Improvements in or Relating to the Steering-Wheels of Mechanically-Driven Vehicles, (for which we have obtained a patent in Great Britain, No. 14,284, bearing date June 27, 1896, and in France, No. 259,395, bearing date September 2, 1896,) of which the following is a specification.

This invention has reference to the steering-wheels of mechanically-driven vehicles.

According to our invention we pivot and support these wheels at the theoretically-correct point—namely, their center—so that perfection of steering is obtained.

In carrying out our invention we mount the bearing part of each steering-wheel respectively upon a bearing around which it rotates, and we mount this latter bearing upon a vertical axis in a continuation of the fixed axle, the end of the axle being in the geometrical center of the steering-wheel, so that the bearing is free to be turned on this axis. When the bearings are turned in the one direction or the other by means of an extension or arm rigidly fixed thereto and operated in a suitable manner by the steering-handle, the wheels turn with them and the vehicle is consequently steered. As the wheel-bearings are comparatively large, it is desirable to place antifriction rollers, balls, or the like between them and the central portion of the wheels.

Figure 2:
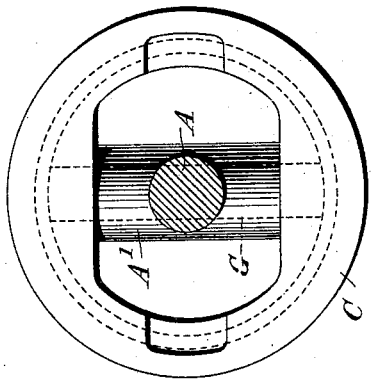
Figure 1:
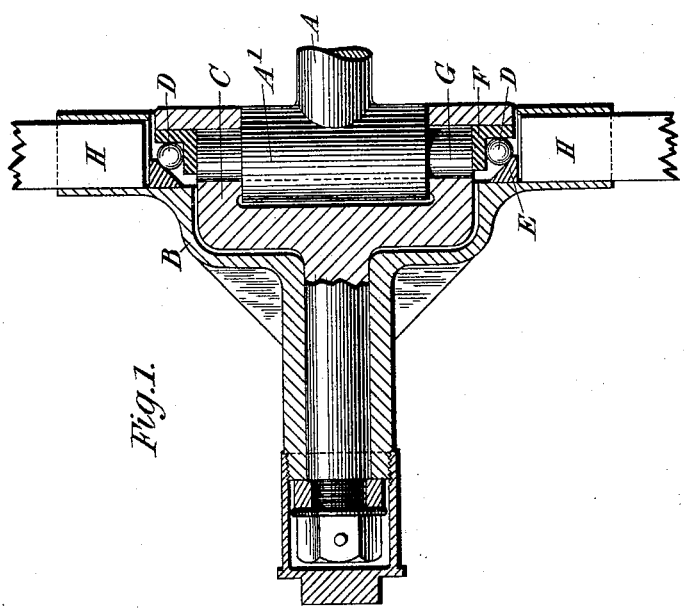

Figure 1 of the accompanying drawings is a vertical section of so much of a steering-wheel of a mechanically-driven vehicle as is necessary to enable the present invention to be understood. Fig. 2 is an elevation of the inner end of the bearing. Fig. 3 is an elevation of the outer end of the same.

Referring to the drawings, A is the fixed steering-axle of the vehicle. B is the box or hub of the steering-wheel H, and C is the bearing, mounted on or carried by the axle. The bearing C is a casting or forging shaped to fit with slight play inside the wheel box or hub B. The weight transmitted between the axle and the wheel is carried on antifriction-balls D, working on or in ball races or paths E and F, respectively attached to or forming part of the wheel-hub B and bearing C. Instead of the balls D, as shown, antifriction-rollers or other equivalent devices might be employed, but in such a case the races or paths would have to be modified accordingly. The various torsional and lateral strains are resisted by the lateral extension of the bearing C, which, with the corresponding part of the hub B, forms an auxiliary bearing of smaller size.

The bearing C is formed on its inner side with a central recess in which fits at top and bottom the enlarged end A' of the steering-axle A. A cylindrical pin G, made a working fit in a vertical hole bored in the enlargement A', extends through the latter, and its projecting ends are made a driving fit in corresponding holes formed in the top and bottom walls of the recess. The pin G thus acts as a vertical axis about which the bearing C, and consequently also the hub of the wheel H, are at all times free to turn or swivel. The pin G is arranged with its vertical center line or vertical axis in line with the central resultant vertical line of pressure passing through the weight-transmitting contact-surfaces of the wheel hub and bearing, and it is also arranged with its horizontal center line in line with the common center line or axis of the wheel and the axle.

By reason of the wheel being capable of rotating freely around the bearing C through the medium of the ring of balls D and the bearing C being in its turn capable of rotating freely within certain limits around the vertical pin G great ease and freedom of steering are obtained. The bearing C can be turned by means of an extension or arm (not shown) rigidly connected thereto and operated by suitable connections from a steering-handle.

We are aware that the use of centrally-pivoted wheels for the purposes described is not novel and we therefore make no general claim thereto.

What we claim, and desire to secure by Letters Patent, is—

1. The combination with a centrally-pivoted steering-wheel, having vertical pivoting-points within the bearing on which the wheel rotates, of a solid lateral extension of such bearing forming, together with a corresponding hollow extension of the hub, an auxiliary bearing of smaller diameter, for the purposes described.

2. The combination of a hollow wheel-hub, constituting the outer member of a composite bearing consisting of a larger antifriction-bearing placed symmetrically in the plane of the wheel and a smaller bearing placed externally of said plane, an internal composite bearing corresponding with the external bearing, and a vertical pivot within the larger bearing and in the plane of the wheel, carried by a vertical sleeve formed on the end of a fixed axle, all substantially as and for the purposes described.

3. The composite ball and sliding bearing for a centrally-pivoted wheel, substantially as and for the purposes described and shown.

In witness whereof we have hereunto signed our names in the presence of two subscribing witnesses.

ERNEST J. CLUBBE.
ALFRED W. SOUTHEY.

Witnesses:
JOHN C. NEWBURN,
GEORGE C. BACON.